United States Patent

Mundt

[15] 3,698,745

[45] Oct. 17, 1972

[54] HOSE COUPLING
[72] Inventor: James E. Mundt, Mentor, Ohio
[73] Assignee: The Weatherhead Company, Cleveland, Ohio
[22] Filed: May 3, 1971
[21] Appl. No.: 139,537

[52] U.S. Cl..............................285/256, 285/334.5
[51] Int. Cl..............................................F16l 33/20
[58] Field of Search...285/334.5, 256, 258, 259, 247, 285/248, 174, 149

[56] References Cited

UNITED STATES PATENTS

| 2,025,427 | 12/1935 | Weatherhead | 285/256 X |
| 2,497,441 | 2/1950 | Detweiler | 285/233 |
| 3,370,870 | 2/1968 | Mahoff | 285/233 |
| 2,517,669 | 8/1950 | Hufferd et al | 285/256 X |
| 2,430,921 | 11/1947 | Edlemann | 285/259 X |

FOREIGN PATENTS OR APPLICATIONS

| 1,238,867 | 7/1960 | France | 285/334.5 |
| 932,488 | 11/1947 | France | 285/256 |
| 1,281,758 | 10/1968 | Germany | 285/334.5 |
| 984,749 | 3/1965 | Great Britain | 285/256 |

Primary Examiner—Thomas F. Callaghan
Attorney—McNenny, Farrington, Pearne & Gordon

[57] ABSTRACT

An inverted flare type hose coupling and its method of production, which includes a tubular eyelet providing at one end internal support for a hose end and at its other end a conical sealing seat for a flared tube. The seat portion of the eyelet is formed over and is supported by a conical ring assembled with the eyelet in a coupling body through an outer internally threaded end of the body.

3 Claims, 3 Drawing Figures

PATENTED OCT 17 1972  3,698,745

INVENTOR.
JAMES E. MUNDT
BY
McNENNY, FARRINGTON, PEARNE & GORDON
ATTORNEYS

HOSE COUPLING

BACKGROUND OF THE INVENTION

This invention relates to hose end couplings and, more specifically, it relates to a connector particularly adapted for use in coupling the end of a flexible hose with the flared end face of a tube or other fluid conduit.

PRIOR ART

Hose end fittings or couplings such as used in automotive hydraulic brake lines have been produced according to a variety of methods and constructions. In their final form, the end fittings of the type under consideration here include at an inner end an annular hose end receptacle and at an outer end an internally threaded portion leading into a conical internal seat surface. A hose end is internally supported by a cylindrical nipple forming the inner periphery of the annular receptacle while a tubular skirt portion forms the outer periphery of the receptacle and functions with the nipple to retain the hose end.

One type of hose coupling of this form is produced by machining or otherwise forming the various portions of the coupling from a unitary blank. A second type of fitting comprises a body member which includes as one piece the skirt and threaded end portions and an integral machined seat assembled with a separate nipple member press fitted into or otherwise secured in the body member. Still another known fitting arrangement includes a nipple portion welded or brazed to the body portion.

Previous methods and constructions of hose couplings, from a manufacturing standpoint, have their principal limitations and disadvantages in their cost of materials and fabrication. Each of the above described types of constructions, and others, require according to their method of manufacture and construction certain machining, forming, welding, and other fabrication techniques in operations which obviously, are reflected in ultimate cost.

SUMMARY OF THE INVENTION

The invention provides a method of fabricating a hose end fitting which, owing to the advantages of its construction, may be manufactured with substantial savings in cost and with advantages in performance over certain previously used couplings.

The fitting or coupling is formed as an assembly of separate parts including a body member, a tubular eyelet, and a support ring. At one end, the eyelet wall is formed into a truncated cone which provides a sealing surface for engagement with a flared end face of a fluid conduit or tube connected to the fitting. The fluid path from the point at which the seal is effected with the coupled tube rearward to the hose end is encircled by a continuous axially uninterrupted surface of the eyelet. This feature reduces the possibility of fluid leaks which might otherwise develop where a surface defining the flow path included a joint of two or more members fused or otherwise secured together.

The sealing surface provided by the eyelet wall is a conventional frustro-conical or inverted flare configuration. The conical shape of the eyelet wall end is supported against sealing forces by the support ring which is provided with a shape complementary to the flared wall of the eyelet. On assembly of the fitting parts, the eyelet and ring are inserted into the body member through the threaded end against an abutment surface. The abutment surface sustains axial tension in the hose to positively prevent pull out of the eyelet and axially supports the ring under sealing loads. The eyelet and ring are preferably retained in the body with a press fit.

The hose end fitting, according to the invention, minimizes manufacturing cost by generally reducing fabrication time through reductions in required machining and elimination of secondary steps such as welding of the parts together. Further, economies result from the possible use of any desired material for each of the various fitting parts.

DESCRIPTION OF THE PREFERRED EMBODIMENT

Figure 1:
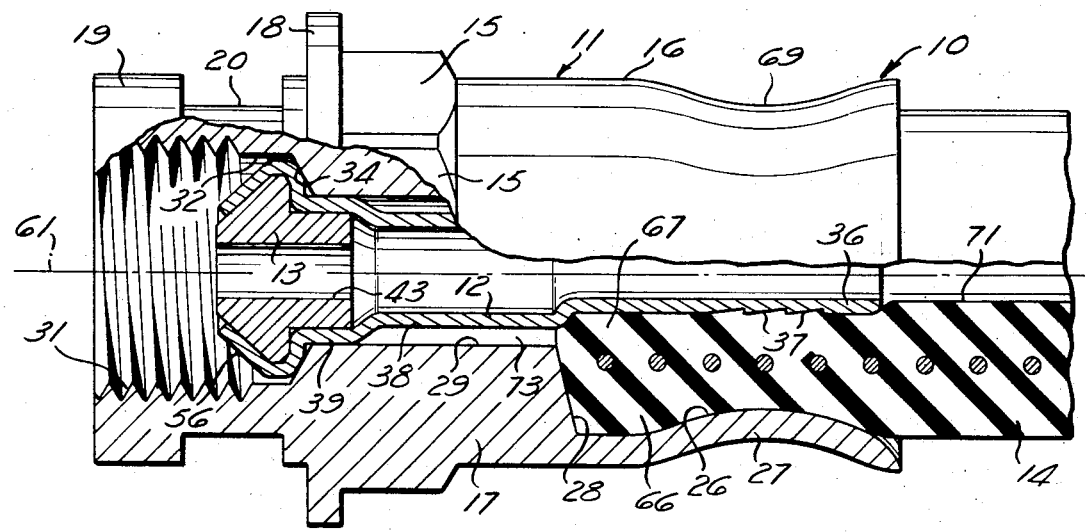
FIG. 1 is a longitudinal view, partially in section, of the hose end fitting of the invention.

Referring now to the Figures, there is shown a tubular hose end fitting or coupling 10 comprising an assembly of a body member 11, a tubular eyelet 12, and a washer-like annular support ring 13. The hose fitting 10 is adapted to sealingly receive therein the end of a flexible reinforced hose or tube 14.

Externally, the fitting body member 11 includes at an inner or hose receiving end a circular skirt portion 16, a central portion 17 provided with wrench flats 15, forming a hexagonal profile in cross section, a radial shoulder or flange 18 adjacent the central portion 17, and a cylindrical end portion 19 having an annular groove 20 in its periphery. The body 11 may be mounted on a bracket or other fixture having a hole large enough to receive the cylindrical end portion 19 and may be retained thereon by abutting the radial flange 18 against the bracket and positioning a retaining washer in the groove 20.

The skirt portion 16 of the body 11 comprises a circularly continuous wall portion 27 of generally uniform thickness and an axial bore 26. The bore 26 terminates at an inner end with a generally radial surface 28 forming a counterbore with an inner cylindrical bore 29. At the opposite or outer end of the body member 11, the cylindrical end portion 19 is internally threaded along the major portion of its axial length. Adjacent the inner end of the internal threads, designated 31, there is provided a relatively short cylindrical bore 32 terminating at an annular abutment surface 34 extending between the short bore 32 and the inner cylindrical bore 29 in a generally radial direction.

The eyelet 12 is an elongated tubular member of varying diameter and of substantially uniform wall thickness. As viewed in the Figures, the rightward or inner end of the eyelet 12 has a diameter roughly equal to the inner diameter of the hose or tube 14. This end, designated 36, forms a nipple over which the hose 14 is positioned for internal support. The exterior of the nipple end 36 may be provided with annular saw teeth or barb-like structures 37 adapted to retain the hose 14 thereon and improve the seal therewith. The barbs 37 may be produced on the nipple portion 36 according to the method disclosed in U.S. Pat. No. 3,479,713. Adjacent the nipple portion 36 is a cylindrical transition or intermediate portion 38 having a diameter larger than the nipple portion 36 but smaller than an adjacent cylindrical eyelet alignment portion 39.

Figure 2:
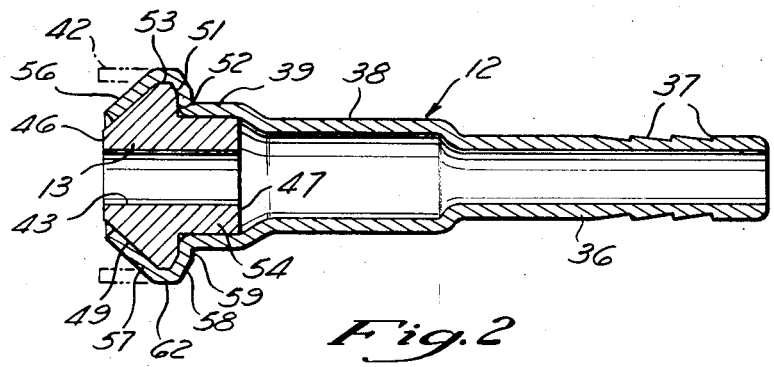
FIG. 2 is a longitudinal, medial, sectional view of an eyelet and support ring assembly.

Preferably, the eyelet 12 is initially produced by drawing or stamping it from sheet or tube stock on an eyelet or other similar machine. The intermediate cylindrical portion 38 is produced by drawing the eyelet material from the maximum to the minimum diameter in two steps because of the limitations of the drawing operation due to the length of the final piece. Additionally, as explained below, the intermediate portion 38 improves the performance of the fitting 10 under vibration. As illustrated in FIG. 2 in phantom, the leftward or outer end of the eyelet 12 is formed with an enlarged provisional cylindrical end portion 42 for reception therein of the support ring 13.

The support ring 13 is adapted to be inserted through the outer end 42 of the eyelet 12 and is provided with a central bore or aperture 43, preferably cylindrical, for the passage therethrough of fluid. As viewed in FIGS. 1 and 2 both a leftward or outer end 46 and a rightward or inner end 47 of the support ring 13 lie in generally radial planes. The exterior of the support ring 13 includes a conical or tapered surface 49 truncated by the radial end face 46. Annular generally radial shoulder surfaces 51 and 52 extend between a preferably cylindrical exterior surface 53, defining the major diameter of the ring 13, and an axial extension 54. The axial extension 54 is cylindrical in shape and is approximately equal to the length of the alignment portion 39 of the eyelet 12. The axial extension 54 internally supports the eyelet alignment portion 39 when positioned therein. The support ring 13, typically, may be produced from a blank on a screw machine. The eyelet 12 and support ring 13 may be constructed of different materials, preferably metallic, chosen for particular qualities, e.g., hardness, economy, machinability, or ductility.

The support ring 13 and eyelet 12 are preferably preassembled before the eyelet is inserted into the body member 11. After the ring 13 is inserted in the end of the eyelet 12, the cylindrical wall end 42 is plastically deformed or crimped radially inward against the conical surface 49 of the support ring 13 by spinning or some other well known suitable metal working process. The support ring 13 is thereby secured and retained within the eyelet 12. The outer or external surface, designated 56, of the conically formed portion, designated 57, of the eyelet 12 provides a sealing surface or seat against which the end of a flared tube or other similarly shaped fluid conduit (not shown) may be forced. The taper angle of the seat surface 56 is maintained or supported by the conical surface 49 of the support ring. Preferably, the cylindrical outer surface 53 of the support ring 13 is dimensioned to fit snugly in the interior of the original cylindrical end 42 of the eyelet 12. After the support ring 13 is installed in the eyelet 12 and the end 42 of the eyelet is crimped over the ring, the eyelet and ring assembly may be inserted into the body 11.

The cylindrical eyelet alignment portion 39 and the axial extension 54 of the support ring 13 are dimensioned to provide a press or interference fit with the inner cylindrical body bore 29. The eyelet portion 39 when positioned in the bore 29 aligns the eyelet 12 with respect to the axis, designated 61, of the fitting 11. The eyelet 12 is pressed into the bore 29 of the body 11 until portions of the generally radial shoulder surfaces, designated 58 and 59 of the eyelet engage the annular abutment surfaces 34. The major diameter of the eyelet 12, defined by a radially outermost section 62 of the conical portion 57, is less than the minor diameter of the internal threads 31 to permit the eyelet to pass freely through the threaded end of the body 11.

The rightward end or nipple portion 36 of the eyelet extends axially through substantially the full length of the skirt portion 16 of the body 11 and forms with the skirt portion 16 an internal annular hose end receiving pocket 66. The fitting 10, once assembled, is installed on a hose end 67 by pushing the fitting 10 and hose 14 together until the hose end 67 abuts the radial surface 28 at the inner end of the bore 26. The skirt 16 may then be crimped, as at 69, tightly around the hose end 67 in a conventional manner to retain the hose end in the pocket 66 and seal the inner hose surface, designated 71 against the exterior of the nipple 36.

Radial clearance 73 between the transition or intermediate portion 38 of the eyelet 12 and the adjacent area of the body bore 29 permits the eyelet 12 to shift radially to accommodate slight misalignments between the axis of the hose end 67 of the center of the seat or conical portion 57 of the eyelet 12 after assembly and thereby improves vibration resistance of the fitting 10.

In a conventional manner, a flared tube may be coupled to the hose fitting 10 by inserting it into the opening defined by the internal threads 31 until it contacts the outer surface or seat 56 of the eyelet 12. A conventional externally threaded apertured nut positioned on the flared tube may be threaded into the internal threads 31 to force the flared tube into the seat 56. Tightening of the nut against the seat 56 causes the eyelet 12 to be more firmly locked in the body 11. The axial force developed by the nut further insures that the eyelet shoulder surfaces 58 and 59 will be firmly seated against the annular abutment surface 34 to prevent the possibility of fluid leakage through a path between these surfaces. Further, the tapered or wedge shape of the abutment surface 34 of the body 11 and the shoulder surface 58 of the eyelet 12 produces a self tightening or wedging action to positively prevent axial pull out of the eyelet 12 due to axial tension in the hose 14.

Figure 3:
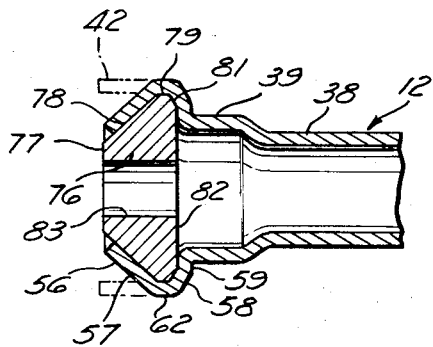
FIG. 3 is a medial sectional view of the forward end of an assembly of the eyelet and a modified support ring.

FIG. 3 illustrates a second embodiment of the invention wherein the support ring is somewhat modified or simplified from that illustrated in FIG. 2. As shown, the eyelet 12 is substantially identical to that illustrated in FIG. 2 and may be formed or crimped onto the modified support ring, designated 76, in substantially the same manner as the support ring illustrated in FIGS. 1 and 2. The same reference numerals are used to designate similar areas or portions of the eyelet 12 as are used in FIG. 2.

The modified support ring 76 is, generally, the same as the forward or conical portion of the first described support ring 13 but without the axial extension 54 thereof. The exterior of the support ring 76 comprises a radial end face 77, a conical surface 87 truncated by the end face 77, an outermost cylindrical surface 79, a conical or tapered annular shoulder 81, and an inner radial end face or shoulder 82. The ring 76 is provided with an axial bore or hole 83 therethrough. The modified support ring 76 may be used where it is not necessary to have a relatively heavy press fit of the eyelet 12 into the bore 29 of the body 11 or where the material forming the eyelet 12 is sufficiently rigid or strong enough to provide an adequate press fit into the bore without the internal support provided by the axial extension 54. It may be appreciated that the eyelet and support ring assembly illustrated in FIGS. 3 may be used in substantially the same manner as that described above in relation to the assembly illustrated in FIG. 2.

Although preferred embodiments of this invention are illustrated, it is to be understood that various modifications and rearrangements of parts may be resorted to without departing from the scope of the invention as defined in the following claims.

What is claimed is:

1. A hose end coupling comprising a tubular body member including at one end an axially extending tubular skirt portion, an intermediate section having a central bore therethrough, and an internally threaded portion at an end opposite said one end, the minor diameter of the threads of said internally threaded portion being greater than the diameter of said central bore, an abutment surface adjacent the end of said central bore facing said internal threads and extending in a direction having a radial component, a relatively thin-walled tubular eyelet forming a first insert assembly member and including at one end a generally cylindrical portion extending axially at least partially through the center of said skirt portion, said cylindrical eyelet portion and said skirt portion together forming a hose end receiving pocket, the cylindrical eyelet portion adapted to internally support a hose end, an end of said tubular eyelet opposite said one end defining a frustro-conical seat portion adapted to sealingly engage a flared end face of a fluid conduit, said frustro-conical seat portion being formed by an eyelet wall surface increasing in radius toward said one end a shoulder portion joining said frustro-conical seat portion and said cylindrical eyelet portion and adapted to engage said abutment surface, a relatively thick-walled annular support element forming a second insert assembly member, said annular support element having a conical shape generally corresponding to the seat portion of said tubular eyelet, said element being disposed between said shoulder portion abutment surface and said seat portion to thereby support the wall of said seat portion during engagement of the latter with the flared end face of the conduit, at least portions of the outer surface of one of said insert assembly members defining a circle closely fitting said central bore of said body member to align said tubular eyelet along the axis of said tubular body member and retain said insert assembly members in said body member.

2. An inverted flare type hose coupling assembly comprising a tubular body member including at a hose receiving end an axially extending tubular skirt portion, an intermediate section having a central cylindrical bore therethrough, and an internally threaded portion at an end opposite said hose receiving end, a minor diameter of the threads of said internally threaded portion being greater than the diameter of said central bore, an abutment surface at the end of said central bore facing said internal threads and extending in a direction having a radial component from said central bore, a relatively thin-walled tubular eyelet including at an inner end a generally cylindrical portion extending axially at least partially through the center of said skirt portion, said cylindrical eyelet portion and said skirt portion together forming a hose end receiving pocket, an end of a flexible hose positioned in said pocket, the cylindrical eyelet portion internally supporting the hose end, said eyelet having a second cylindrical portion press fitted into said central bore of said body member, the wall of said eyelet at an outer end of said second cylindrical portion extending in a direction at least partially radially outwards to a major diameter portion of the eyelet, said major diameter portion being smaller than the minor crest diameter of said internal threads, the wall of said eyelet extending radially inward and axially forward from said major diameter portion to the outer end of the eyelet to form a frustro-conical wall providing a seat on its exterior surface, said seat surface adapted to engage a flared end face of a fluid conduit a relatively thick-walled annular support member, said frustro-conical wall being crimped over said annular support member internally supporting said conical wall, said support member having an outer end adjacent the outer end of the eyelet and a conical shape corresponding to the desired shape of the conical eyelet wall.

3. A hose coupling as set forth in claim 2 wherein said annular support member includes a cylindrical axial projection extending into and radially supporting said second cylindrical portion of said eyelet.

* * * * *